United States Patent Office 3,205,838
Patented Sept. 14, 1965

3,205,838
EXTRUSION PRESSES
Heinz Frobeen, "Zum Rosenhof," Ostermoor, near Brunsbuttelkoog, Holstein, Germany, and Karl-Heinz Petersen, 1 Cuxhavener Strasse, Brunsbuttelkoog, Holstein, Germany
Filed Apr. 28, 1961, Ser. No. 106,300
Claims priority, application Germany, Oct. 7, 1960, Sch 28,588
7 Claims. (Cl. 107—14)

This invention relates to extrusion presses, such as those which may be used particularly in the food industry, for processing fats and dough.

For the extrusion of different kinds of plastic masses, plain surfaced or grooved rolls have been used, which rolls rely on friction for feeding the mass to be processed and subjecting it to pressure in a chamber. Such chamber is closed by a template, a slit or orifice of some other profile, so that the mass emerges from the orifice in the form of a strip or profiled strand.

The friction between the mass of material and the rolls utilized to convey the material to the chamber, can be increased by providing the rolls with grooved instead of plain surfaces. The maximum utilizable degree of friction is obviously determined by the internal cohesion of the mass concerned, that is to say, by the force required to displace two cross-sectional units of the mass relatively to each other. This results in a natural upper limit for the pressure attainable in the pressure chamber between the rolls and the extrusion orifice, which varies according to the nature of the material. In materials with only slight consistency, as for example fats, the friction is so low that it is not possible to attain any adequate pressure at all in the chamber for extrusion through the template orifice.

The principle of the use of friction for pressure production, however, has other disadvantages, which may be particularly effective in the case of flour doughs. The volume efficiency, that is to say the ratio of the expressed volume of dough to the theoretical conveying capacity of the rolls, which is equal to the development of the roll surface times the width of gap between the rolls, in the case of grooved rolls amounts at the most to about 20%. The other 80% is used in the kneading operation, which the rolls produce on the dough. Due to this unwanted kneading, in many cases the original structure of the dough is undesirably altered and the product impaired.

To avoid such disadvantages, attempts have been made to obviate the principle of friction by providing the rolls with mechanically controlled eccentric sliders, similar to those in rotary compressors. Such sliders are intended to convey the dough in a positive manner. Their practical application, however, is accompanied by difficulties because their operation is very easily impaired by the dough, crust formation, hardening and the like.

An object of the present invention is to provide an improved extrusion press with a view to obviating or minimizing the foregoing disadvantages.

According to the present invention there is provided an extrusion press comprising a pressure chamber, means for feeding plastic extrusion material to the pressure chamber, said feeding means including two identical and axially parallel roll-like bodies rotatable in opposite directions and adapted to feed masses of the material into said chamber, each roll-like body being in the form of an equal-sided prism with plane boundary surfaces or of a prismoid with concave boundary surfaces, said pressure chamber having two oppositely disposed wall parts arranged to form displaceable strippers adapted to follow and continuously contact the boundary surfaces of the roll-like bodies during the rotation thereof.

For a better understanding of the invention and to show how the same may be carried into effect, reference will now be made, by way of example, to the accompanying drawings, in which.

Figure 1:
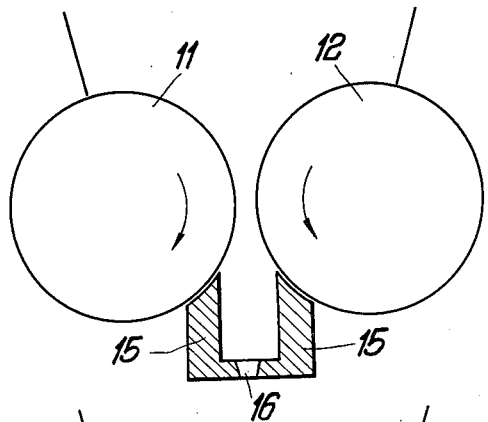
FIG. 1 is a diagrammatic representation of a known roll and pressure chamber arrangement, with rolls having plain roll surfaces.
Figure 2:
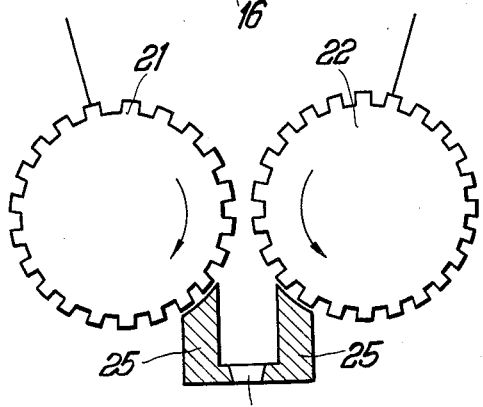
FIG. 2 is an arrangement similar to FIG. 1, but with grooved rolls.
Figure 3:
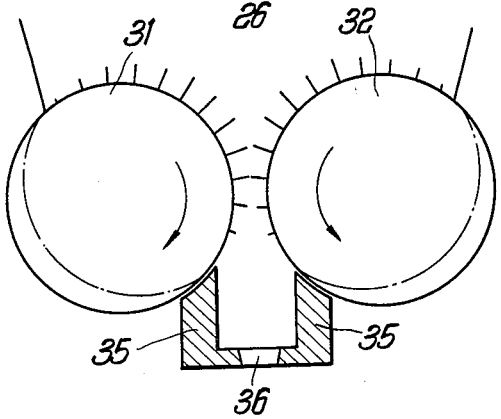
FIG. 3 is another arrangement similar to FIG. 1, but with rolls having controlled eccentric sliders.

The known arrangement shown in FIG. 1, comprises a pair of rolls 11, 12, having plain surfaces and mounted for rotation into and out of a pressure chamber defined by rigid walls 15, the pressure chamber being formed with an outlet orifice 16 through which a mass of material being processed, can be extruded from the pressure chamber in the form of a profiled strand. The known arrangement illustrated in FIGURE 2 is similar to that of FIGURE 1, the rigid side walls of the pressure chamber being shown at 25 and the outlet orifice at 26. In FIGURE 2, however, the rolls 21, 22 are formed with peripheral grooves. The known arrangement of FIGURE 3 again comprises a pressure chamber having rigid walls 35 and an outlet orifice 36 through which a mass of material being processed can be extruded. In FIGURE 3, the rolls 31, 32 are provided with built-in radially disposed and movable sliders which are controlled by means of eccentric mechanisms (not shown) in such a manner that with advancing rotation of the rolls 31, 32, the sliders always produce the same pattern as shown diagrammatically in FIGURE 3 and provide a positive action in conveying the extrusion material into the pressure chamber.

Figure 4:
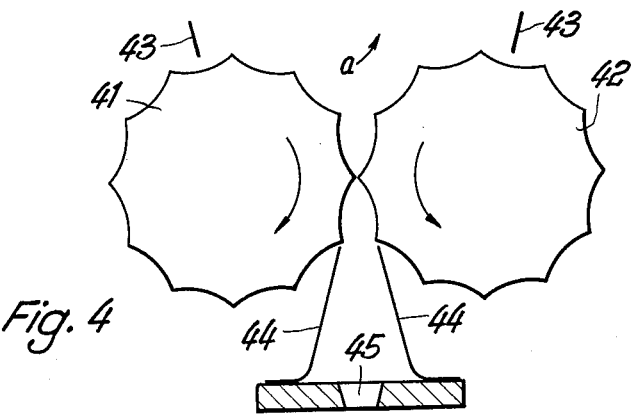
FIGS. 4 and 5 are diagrammatic representations showing a feed device according to one embodiment of the present invention, in two different working stages.
Figure 5:
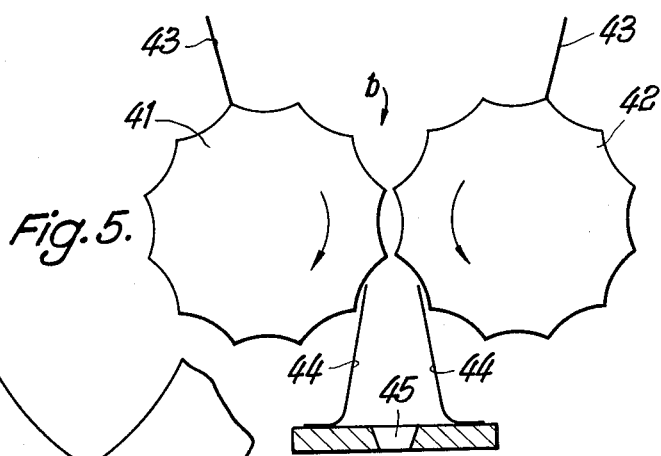

The embodiment of the present invention shown in FIGS. 4 and 5 comprises a pair of roll-like bodies 41, 42 mounted for rotation adjacent the opposite side walls 43 of a charging hopper and so arranged that during rotation, the peripheral portions of the roll-like bodies pass into and out of the hopper. The roll-like bodies 41, 42 have peripheral surfaces constituted by axially extending cusps or apexes with concave surfaces between the cusps. The bodies 41, 42 are right prismoidal members with equal bases. Positioned beneath the rolls 41, 42 is a pressure chamber having side walls 44 and an outlet orifice 45 in the bottom wall thereof. The side walls 44 are formed of spring plates secured at their lower ends to the bottom walls of the chamber, the upper ends of the side walls being resiliently displaceable so that said upper ends can follow and maintain continuous contact with the boundary surfaces of the roll-like bodies 41, 42 during the opposite rotation of said bodies. The arrangement is such that the upper ends of said walls act as strippers for removing extrusion material from the roll surfaces during rotation of the latter. These walls 44 may be prestressed so as to bear at their upper ends against the roll-like bodies even without the back-pressure of the extrusion material in the pressure chamber.

Operation of the extrusion press according to FIGS. 4 and 5 is as follows: The roll-like bodies 41, 42 rotate in opposite directions and are driven at the same speed in such a manner that a peak or tip of one roll always comes into registry with a peak or tip of the other roll. In other respects, the boundary surfaces of the rolls 41, 42 may be smooth and plain. A mass of extrusion material entering the wedge-shaped gap $a$ (FIG. 4) from the hopper, is brought into the space $b$ (FIG. 5) during rotation of the rolls. Shortly after passing through the narrowest part between the two rolls, the mass is prevented from moving along with the rolls by the strippers, formed by the walls 44, which bear continuously against the surface of the rolls 41, 42, and the mass is forced into the pressure chamber of the press. When the chamber is filled with extrusion material and more material is forced into said chamber, the chamber pressure increases, and the material in the chamber is then forced out through the orifice 45, so that extrusion begins. With increasing chamber pressure, the pressure against the inner faces of walls 44 increases, causing the tips of the walls 44 to have more intense contact with the surfaces of the rolls 41, 42. After the stripping operation, the surfaces of the rolls 41, 42 are completely free from extrusion material, so that said surfaces are clean when they re-enter the hopper.

Figure 6:
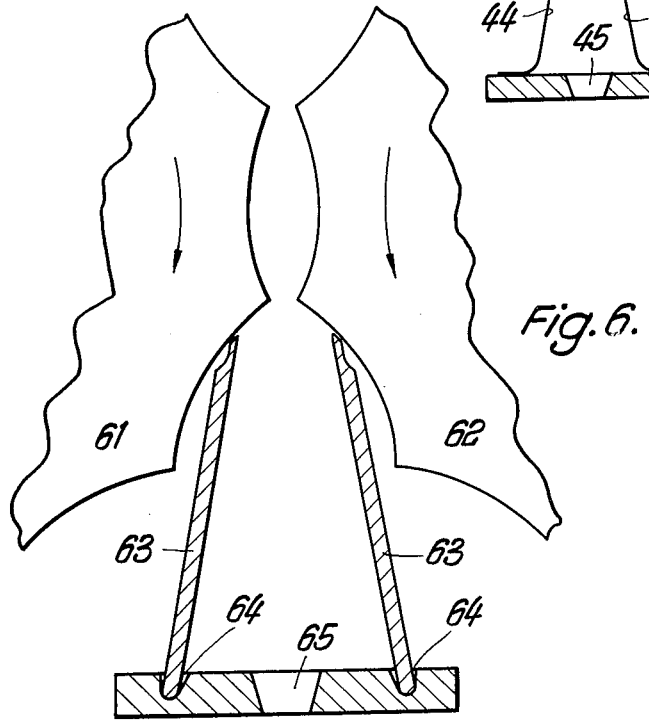
FIG. 6 shows a modified embodiment of the invention.

The embodiment illustrated in FIG. 6, comprises side walls 63 of a pressure chamber and arranged to serve as strippers for the roll-like bodies 61, 62. The side walls 63 are of more robust and rigid construction than the corresponding side walls of FIGURES 4 and 5, the side walls 63 comprising movable plates, pivotally mounted in grooves 64 formed in the bottom wall of the pressure chamber, the bottom wall being formed also with an outlet orifice for the extrusion of material from the pressure chamber. The movements of the side walls 63 may be produced solely by the pressure of the plastic mass contained in the pressure chamber. However, the movements of the walls 63 may also be derived mechanically from the drive of the roll-like bodies in such a manner that the tips of the end walls 63 forming the strippers, bear constantly against the boundary surfaces of the roll-like bodies during the rotation of the latter.

An advantage of the described embodiments resides in the fact that they operate substantially independently of the internal friction of the extrusion material. Therefore, in addition to the extrusion of normal dough, other materials such as fat may be extruded, which materials are not normally able to be conveyed by grooved rolls and certainly not by plain surfaced rolls. Moreover, a volume efficiency of approximately 100% can be attained. In addition, the extrusion material is not "disaggregated" by undesired high rubbing and kneading, so that in many cases a better product is obtained.

A press according to the invention may be arranged for either continuous or intermittent operation. In continuous operation, the roll bodies rotate continuously and therefore material is also extruded continuously. However, due to the limited number of working surfaces on the rolls, the pressure impulses in the mass of material occur in a periodically fluctuating manner, resulting in slight variations in thickness in the extruded strand. This, however, is insignificant in continuous operation, especially since the extruded strand is usually rolled again afterwards. In intermittent operation, on the other hand, the rolls make periodic angular rotational stepwise movements of a predetermined magnitude, for example 5°, 7°, 10°, etc., alternating with stops of substantially the same duration, the small amount of the mass extruded in each period as a rule being at once removed, as by cutting, from the exterior of the template orifice, thereby to form a finished raw product. Since these periodic rotary movements rarely coincide with the surface pitch of the rolls, it may happen for example that in the first period there will be a trough on one roll between two tips of the other roll, while in the second period, there will be a tip of one roll between two half surfaces of the other roll, thus producing different pressure impulses in the different periods. The effect is then that the weights of extruded material obtained in the first period will differ from those obtained in the second period, and these will also differ from the weights obtained in the third period, and so on, until the cycle is repeated again.

In order to ensure, as far as possible, that a constant quantity of material is conveyed in the individual steps of the rolls, the relative position (phase position) of the counterwise rotating roll-like bodies may be variable, so that periodically a certain quantity of dough may be extruded and then cut off at the template orifice, in order for example to produce slices of a certain thickness (fancy cakes), although the number of individual surface units per roll must be restricted to about 10 to 16 surfaces at the most, especially for intermittent operation. If the movement of the roll-like bodies is so controlled that a tip always comes against a tip, an efficiency of about 100% is obtained.

We claim:

1. An extrusion press comprising a pair of feed rollers adapted for rotation in opposite directions about parallel axes, said feed rollers each being of right prismoidal shape and having a cross-section with a peripheral surface with a plurality of apices, each apex of one of said rollers being aligned with a corresponding apex of the other roller during rotation of said rollers, a pair of spaced displaceable wall parts each being supported for engaging the peripheral surface of one of said rollers, a closure member coupled to both said wall parts and provided with an opening, said feed rollers being adapted for being supplied with extrudable material, said extrudable material being urged between said parts by the rollers with the latter rotated to exert a force on said wall parts to maintain the same in contact with the periphery of the rollers as said rollers are rotated.

2. An extrusion press as claimed in claim 1 wherein said rollers have concavities on the peripheries thereof such that said apices are cusp like.

3. An extrusion press as claimed in claim 1 wherein said opposite displaceable wall parts are resilient plates each having one end fixedly supported and an opposite end in resilient contact with the surface of an associated roller.

4. An extrusion press as claimed in claim 1 wherein said opposite displaceable wall parts are rigid members each having one end pivotally supported and an opposite end in contact with the surface of an associated roller.

5. An extrusion press as claimed in claim 4 wherein said wall parts are supported to converge in a direction towards said surfaces such that pressure of said extrudable material in said pressure chamber acts to urge the ends of the rigid walls which are in contact with said surfaces of the roller against the latter with increased intensity.

6. An extrusion press comprising means defining a pressure chamber, feed means for feeding plastic material to said pressure chamber, said feed means comprising two identical and axially parallel roller bodies which are driven in rotation in opposite directions, each of said bodies being of prismoidal form and having a periphery constituted by a plurality of axially extending boundary surfaces, said means defining the pressure chamber including two oppositely disposed displaceable wall parts positioned beneath said bodies, each wall part being in contact with the periphery of a corresponding body whereby said wall parts constitute strippers for following and continuously contacting the boundary surfaces of said roller bodies during rotation thereof, said displaceable wall parts being constituted by spring plates having one end fixedly supported.

7. An extrusion press comprising means defining a pressure chamber, feed means for feeding plastic material to said pressure chamber, said feed means comprising two identical and axially parallel roll-like bodies driven in rotation in opposite directions, each of said bodies being of prismoidal shape and having a periphery constituted by a plurality of axially extending boundary surfaces, said means defining the pressure chamber including two oppositely disposed displaceable wall parts which constitute strippers, and means supporting said wall parts with ends thereof in contacting engagement with the boundary surfaces of said roll-like bodies during rotation of said bodies such that said strippers are held against the boundary surfaces of the rotating roll-like bodies with a variable force in accordance with the pressure of the plastic material in said pressure chamber.

References Cited by the Examiner

UNITED STATES PATENTS

| | | | |
|---|---|---|---|
| 2,208,905 | 7/40 | Kremmling et al. | 107—8.3 |
| 2,675,304 | 4/54 | Komarek | 18—12 X |
| 2,784,683 | 3/57 | Curtis et al. | 107—12 X |
| 2,807,047 | 9/57 | Olson et al. | 18—12 X |
| 2,965,926 | 12/60 | Von Haase | 18—12 X |

FOREIGN PATENTS

| | | |
|---|---|---|
| 1,058,636 | 11/53 | France. |
| 926,296 | 9/56 | Germany. |
| 380,987 | 9/32 | Great Britain. |

OTHER REFERENCES

German application, 1,046,532, printed Dec. 18, 1958 (K1 2b 7/02), corresponding to U.S. Pat. 2,909,131, Oct. 20, 1959.

WALTER A. SCHEEL, *Primary Examiner.*

W. J. STEPHENSON, M. V. BRINDISI, CHARLES A. WILLMUTH, ROBERT E. PULFREY, *Examiners.*